United States Patent [19]
Holstein

[11] 4,079,539
[45] Mar. 21, 1978

[54] TEMPERATURE RESPONSIVE FISHING DEVICE

[76] Inventor: Frederick W. Holstein, 1331 Howe St., Racine, Wis. 53403

[21] Appl. No.: 755,184

[22] Filed: Dec. 29, 1976

[51] Int. Cl.² .................... A01K 85/00; A01K 95/00
[52] U.S. Cl. ................................ 43/43.13; 43/42.03; 43/42.22; 43/42.39
[58] Field of Search ............... 43/43.13, 42.03, 42.06, 43/42.39, 42.31, 42.32, 42.22

[56] References Cited

U.S. PATENT DOCUMENTS

| 2,679,227 | 5/1954 | Symonds | 43/42.22 X |
| 3,796,000 | 3/1974 | Nye | 43/43.13 |
| 4,028,839 | 6/1977 | Stubblefield | 43/43.13 |

*Primary Examiner*—Hugh R. Chamblee
*Attorney, Agent, or Firm*—Wegner, Stellman, McCord, Wiles & Wood

[57] ABSTRACT

A temperature responsive fishing device adapted to be secured to a line so that it may be pulled forwardly through water and change its depth in response to a change in the ambient temperature of the surrounding water includes a hydroplane, a weight movably disposed within a housing to change the longitudinal position of the center of gravity of the device substantially when moved, thermal control elements responsive to ambient temperature positioned near the forward and rearward end of said housing to retain the weight at their respective housing ends whenever ambient temperature is within a predetermined range, and means for effecting movement of the weight. When the weight is retained at the forward end of the housing, the hydroplane is tilted forwardly thereby causing oncoming water to react on the hydroplane to force the device to descend. When the weight is retained at the rearward end of the housing, the hydroplane is tilted rearwardly thereby causing oncoming water to react on the hydroplane to force the device to ascend.

24 Claims, 12 Drawing Figures

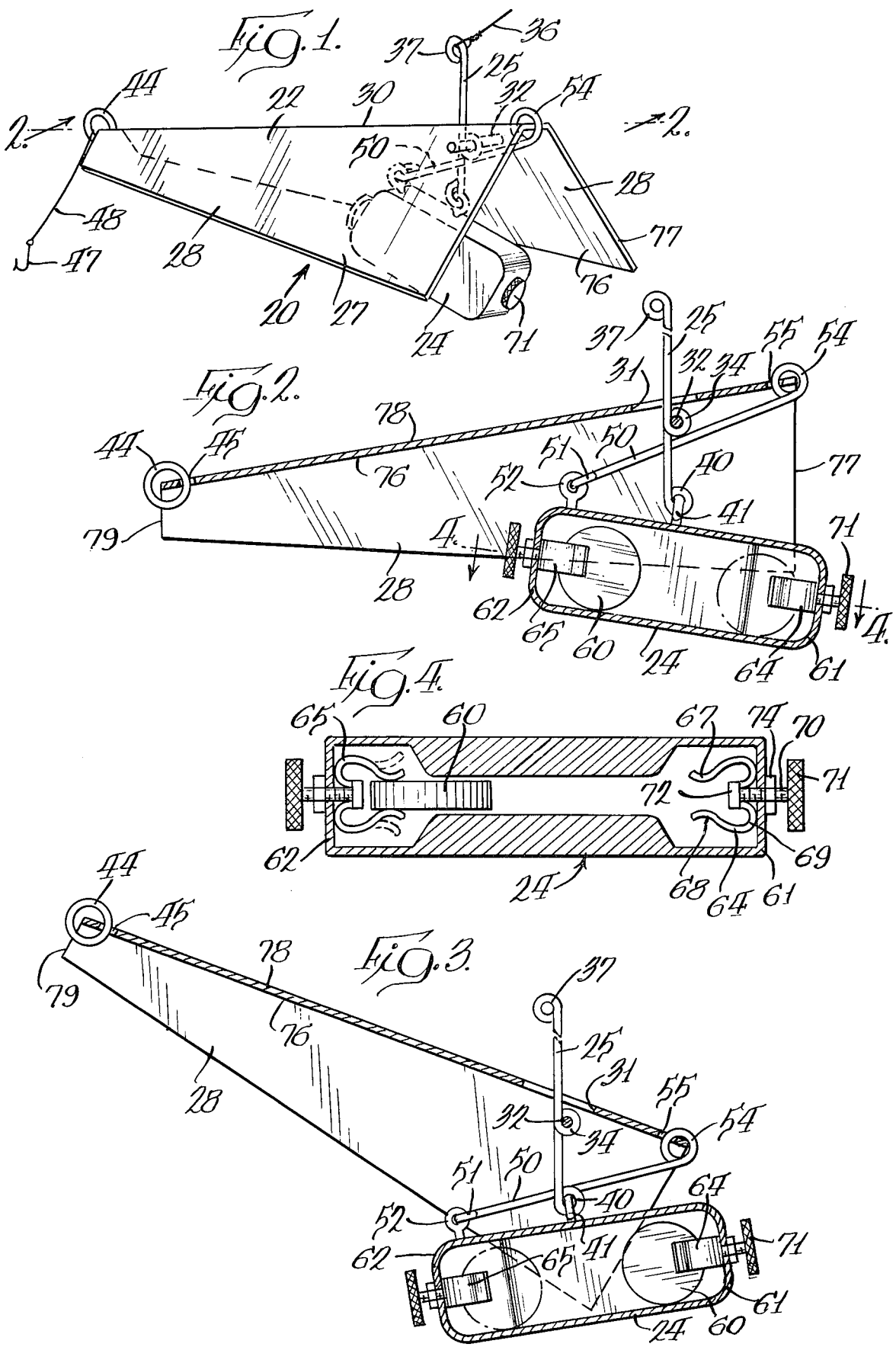

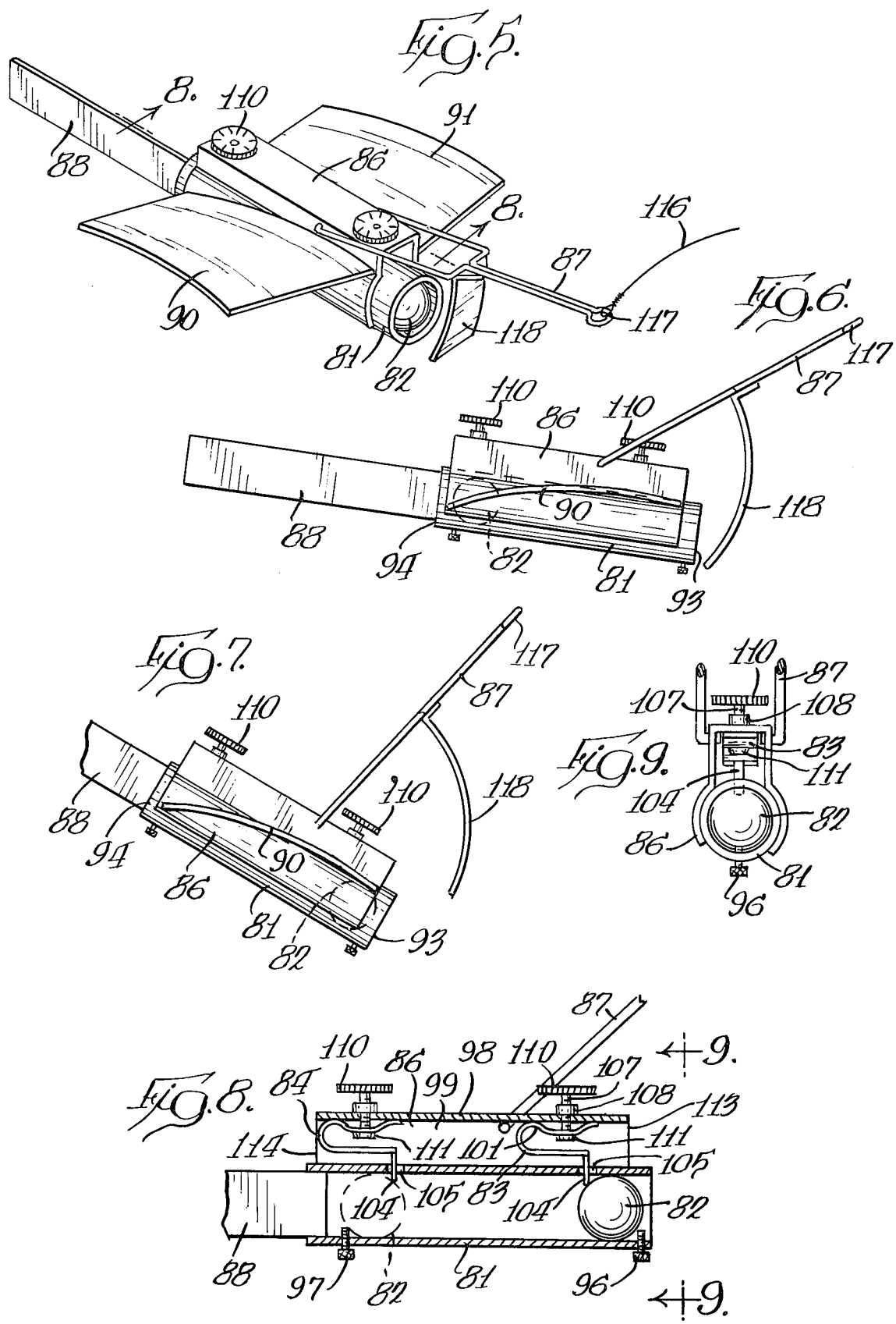

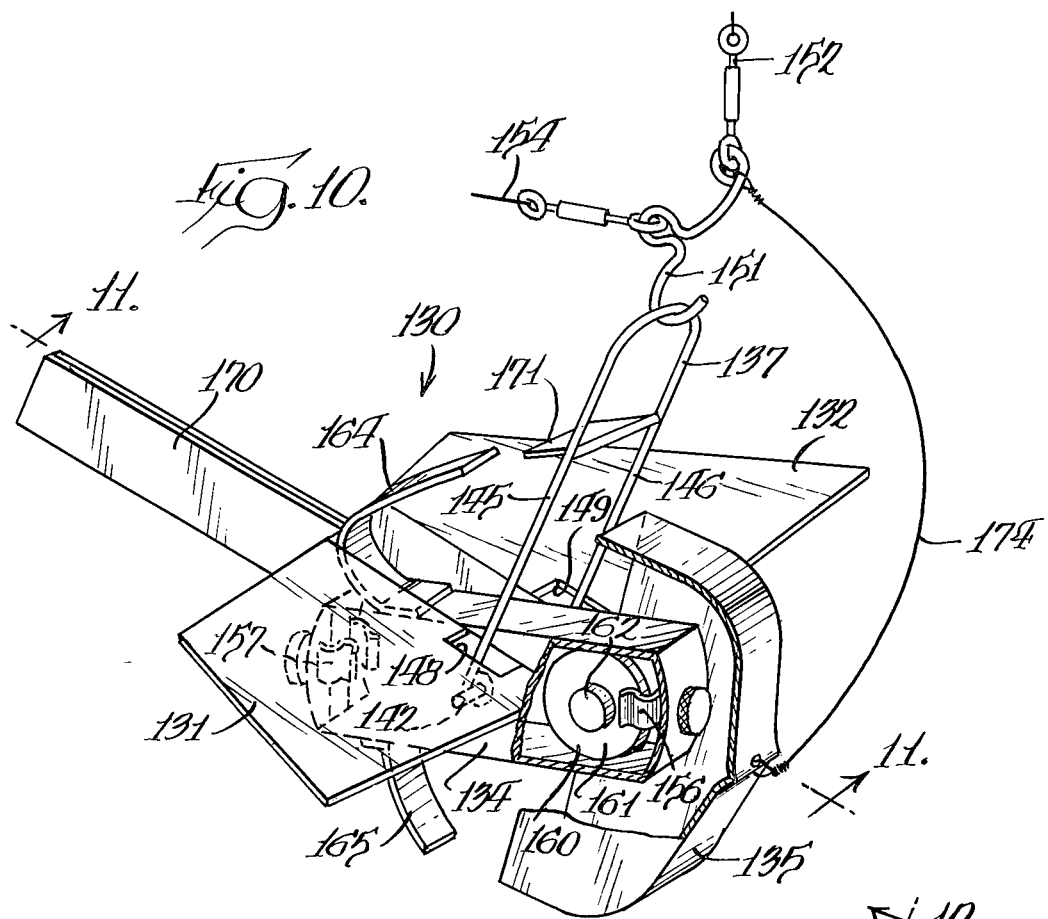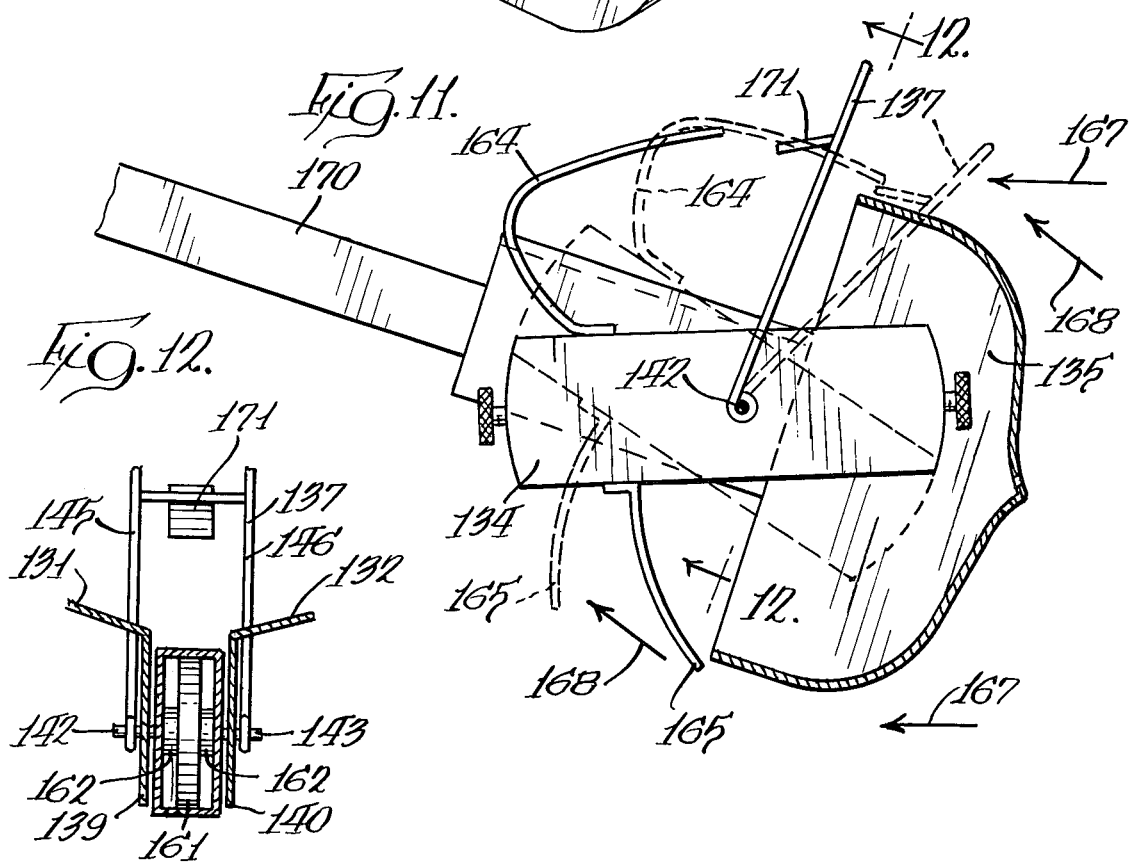

TEMPERATURE RESPONSIVE FISHING DEVICE

BACKGROUND OF THE INVENTION

This invention relates generally to a fishing device and, more particularly, to a temperature responsive device that moves to a depth at which the water has a temperature within a range selected by an operator.

It is relatively well known that fish are found in water having a temperature which is to their liking and most conducive to the existence of their species. One reason, besides the temperature itself, is that the oxygen content of the water is dependent on its temperature. It is also known that a thermal differential or gradient usually exists in bodies of water with a relatively warm water temperature being found near the surface and a colder water temperature being found near the bottom.

As a result, persons who know at what water temperature a particular species of fish is likely to be found often measure water temperature at various depths with a thermometer. When the depth at which the desired temperature water is noted, a weight with a lure or hook attached is lowered to that depth. When trolling, a device having a diving plane has been employed which seeks a specific depth when it is pulled through the water. However, the depth at which the device will eventually travel is difficult to determine accurately because that depth is at least partially dependent on its velocity, its weight, the drag or lift generated by its aerodynamic configuration, and the length of line. Further, as the water circulates or as the device is moved through the water, conditions change such that the depth at which a particular water temperature will be found is also likely to change, so that the device no longer lies within the desired temperature range.

Thus it is apparent that it is highly desirable to employ a fishing device or a lure which seeks a depth based solely on a predetermined ambient water temperature. Temperature responsive devices are known in the art, but they are not entirely satisfactory. Illustrative of these devices are Wieszeck U.S. Pat. No. 3,305,964 and Nye U.S. Pat. No. 3,796,000 and U.S. Pat. No. Re. 28,262. Wieszeck shows a variety of devices including a simple bimetal lure having a shape which is altered with varying temperature and a relatively complex device having a vane operated by a thermally responsive bellows. Nye U.S. Pat. No. 3,796,000 and U.S. Pat. No. Re. 28,262 both show a device having a rotatable inclined fin which is controlled by a bimetallic element. The bimetallic element operates a latch which prevents rotation of the fin.

While some of the embodiments illustrated in the foregoing art have means for adjusting the activating temperature of the bimetallic element, none discloses a device in which the upper and lower temperature limits can be adjusted independently. Further, the prior art devices cannot generally be trolled on the surface of the water. It therefore becomes highly desirable to provide a device which overcomes these deficiencies.

SUMMARY OF THE INVENTION

It is the principal object of the invention to provide a temperature responsive device for fishing or the like which will seek a depth in water at which a particular temperature range exists regardless of the aforementioned factors. It is also an object of the invention to provide a device in which the upper and lower limits of its operative temperature range are easily and independently adjustable.

In accordance with the invention, a fishing device includes one or more hydroplane or wing-like members, a weight control housing secured thereto, a weight movable between a forward and a rearward position and a pair of thermal control elements selectively operable to retain the weight at the forward or rearward ends of the housing. When the weight is retained at the forward end, the center of gravity lies forwardly so that the device descends. When the weight is retained at the rearward end the center of gravity lies rearwardly so that the device ascends.

In exemplary embodiments of the invention, the thermal control elements are formed from bimetallic strips at opposite ends of the weight control housing which deform when subjected to changes in temperature to either trap or release the weight. The forward bimetallic element holds the weight until a relatively cool water temperature is encountered, while the rearward bimetallic element operates oppositely to hold the weight until a relatively warm water temperature is encountered. The bimetallic elements may be configured to grip or to trap the weight against the end of its housing. Each bimetallic element may be adjusted to modify the temperature range within which they are operative. Preferably, the weight is shaped to roll freely between the ends of its housing when not restrained by the bimetallic elements.

The hydroplane member is shaped to provide desirable aerodynamic action. It may consist of a single member or a pair of oppositely disposed members. In one embodiment, the hydroplane member has an inverted transverse cross section. In another embodiment, it is shaped like an airfoil or wing so as to achieve suitable lift characteristics.

In two of the embodiments described herein, the movement of the weight is controlled by gravity. Means are provided for pivotally mounting the weight housing and causing it to rotate so that the end at which the weight is held by the thermal elements is positioned at a level higher than the other end thereby permitting the weight to roll downhill.

In the other described embodiment, the weight housing is always tilted downwardly, but has an open forward end. The pressure of oncoming water is able to force the weight rearward when released by the forward thermal element. A nosepiece blocks the open forward end when the device is ascending so that the force of the oncoming water is obstructed thereby allowing the weight to move downwardly through still water when released by the rearward thermal element.

A device constructed in accordance with the invention will imitate the movement of a fish by surfacing and diving and by moving to and fro sideways through the water thereby attracting fish. The device herein may be trolled at the surface of the water by deactivating the thermal control elements. The device eliminates the need for a thermometer, a bait actuator, a weight and, in some cases, a lure.

BRIEF DESCRIPTION OF THE DRAWINGS

FIG. 1 is a perspective view of one embodiment of the temperature responsive fishing device constructed according to the invention;

FIG. 2 is a cross-sectional view of the temperature responsive fishing device taken along line 2—2 of FIG.

1 showing the fishing device in an ascending of surfacing position;

FIG. 3 is a cross-sectional view of the temperature responsive fishing device similar to FIG. 2, but showing the fishing device in a descending or diving position;

FIG. 4 is a cross-sectional view of the weight control housing taken along line 4—4 of FIG. 2 particularly illustrating the bimetallic thermal elements and the weight;

FIG. 5 is a perspective view of a second embodiment of the temperature responsive fishing device constructed according to the invention;

FIG. 6 is a side elevational view of the temperature responsive fishing device of FIG. 5 showing the fishing device in an ascending position;

FIG. 7 is a side elevational view of the temperature responsive fishing device of FIG. 5 showing the fishing device in a descending position;

FIG. 8 is a cross-sectional view of the temperature responsive fishing device taken along line 8—8 of FIG. 5 particularly illustrating the bimetallic thermal elements and the spherical weight;

FIG. 9 is a front elevational view of the temperature responsive fishing device taken along line 9—9 of FIG. 8;

FIG. 10 is a perspective view of a third embodiment of the temperature responsive fishing device constructed according to the invention having portions thereof broken away to show the bimetallic thermal elements and the weight;

FIG. 11 is a cross-sectional view of the temperature responsive fishing device taken along line 11—11 of FIG. 10 illustrating its orientation when the device is descending and also illustrating in phantom the position of the weight housing relative to the device as a whole when ascending; and FIG. 12 is a cross-sectional view of the temperature responsive device taken along line 12—12 of FIG. 10.

DESCRIPTION OF THE PREFERRED EMBODIMENTS

The Embodiment Shown in FIGS. 1-4

Referring to FIGS. 1-4, a temperature responsive fishing device, generally designated 20, constructed according to the present invention includes an inverted V-shaped hydroplane 22, a weight control housing 24 containing a thermal control mechanism, and an upright towing mast 25 pivotally connected to the housing 24 and the hydroplane 22. The hydroplane 22 consists of a pair of tapering planar members 27 and 28 which are downwardly diverging and have their respective upper edges joined at an apex 30 at the top of the hydroplane 22. The mast 25 extends from a position between the planar members 27 and 28 upwardly through an opening 31 formed in the top of the hydroplane 22. Extending between the planar members 27 and 28 immediately below the opening 31 is a pivot pin 32. The mast 25 is pivotally connected to the pin 32 by a loop 34 formed therein which is wrapped about the pin 32. The opening 31 is sufficiently large to permit the hydroplane 22 to swing relative to the mast 25 about a transverse horizontal axis intermediate the ends thereof.

A towing line 36 has one end secured to a loop 37 formed in the upper end of the mast 25 while the other end of the line 36 is connected to a towing rod (not shown). The lower end of the mast 25 has a loop 40 which is inserted through an eyelet 41 carried at the top of the housing 24 intermediate the ends thereof. The loops 40 and 41 define a hinge which permits the housing 24 to pivot relative to the mast 25. A ring 44 extends through an opening 45 in the top of the hydroplane 22 to provide a rearward fixture to which a fishing lure or hook 47 may be secured via a line 48.

In operation, the weight of the housing 24 and the hydroplane 22 acting on the lower portion of the mast 25 maintains the mast 25 in an upright position since the top portion of the mast 25 is supported by the line 36 which extends generally forwardly and upwardly. The hydroplane 22 is movable between an ascending position (FIG. 2) and a descending position (FIG. 3) relative to the upright mast 25.

A strut 50 extends between the forward end of the hydroplane 22 and the rearward end of the housing 24 and operates to constantly orient the housing 24 at an angle which is equal in degrees but opposite in direction to the angle of the hydroplane 22. The strut 50 has a loop 51 passing through an eyelet 52 which is secured to the top of the housing 24 rearward of the eyelet 41 to hinge the strut 50 to the housing 24. A loop 54 is formed in the forward end of the strut 50 and is inserted into an opening 55 formed at the forward end of the hydroplane 22 at its apex 30 thereby pivotally securing the strut 50 to the rear end of the housing 24 and to the forward end of the hydroplane 22.

A cylindrical or disc-shaped weight 60 is movable within the housing 24 between its forward end 61 and its rearward end 62. The housing 24 is configured internally in a manner to maintain the weight 60 on its circular edge. The weight 60 has sufficient mass so that the center of gravity of the device 20 is moved substantially when the weight 60 is moved. Positioned within the housing 24 at the ends 61 and 62 are arcuate generally W-shaped bimetallic elements 64 and 65, respectively. Since each of the bimetallic elements are similarly shaped and mounted within the housing 24, only one will be described in detail. The element 64 has spaced leg portions 67 and 68 and a base portion 69 having a central segment which is spaced from the end 61. A threaded screw 70 having a disc-shaped external knob 71 and an upset end portion 72 in cooperation with a nut 74 fixed to the housing 24 adjustably secures the bimetallic element 64 at its respective end 61. When the screw 70 is tightened by turning the knob 71 so that it moves outwardly from the end 62 the end portion 72 applies pressure on the base 69 of the bimetallic element 64 to move it towards the end 61 and close the legs 67 and 68 of the bimetallic element 64 together. The inherent resiliency of the bimetallic element 64 maintains it against the upset end portion 72 so as to secure the bimetallic element in selected position.

The bimetallic elements 64 and 65, which provide the temperature responsive controls for the device, are formed from two metal strips, having different temperature coefficients of expansion which are bonded together so that when the temperature changes, the elements bend or curl. Herein, the bimetallic elements 64 and 65, when subjected to changes in temperature, either open or close. For the purposes of this invention, the bimetallic elements 64 and 65 operate oppositely. The legs 67 and 68 of bimetallic element 64 move apart as temperature decreases and close together as temperature increases, while the legs 67 and 68 of bimetallic element 65 separate when temperature increases and close when temperature decreases.

When the device 20 is pulled by the line 36 through the water having a water temperature cooler than that at which the device is desired to operate, the hydroplane 22 and the housing 24 will be in an ascending position as shown in FIG. 2. Since the hydroplane 22 is being pulled through the water, water will be forced to act on the bottom surface 76 of the planar members 27 and 28, thus causing the device 20 to rise. At this point, the housing 24 is tilted downwardly and forwardly with the circular weight 60 being held between the legs 67 and 68 of the bimetallic element 65. Until the temperature of the water increases, the hydroplane 22 is maintained in this position, since the center of gravity of the device 20 is positioned rearwardly of the pivot pin 32. When relatively warm water is found, the legs 67 and 68 of the bimetallic element 65 will open permitting the weight 60 to roll downwardly and forwardly within the housing 24 24 toward the forward end 61. Because of momentum, the moving weight 60 will force its way between the legs 67 and 68 of the bimetallic element 64 to the position shown in phantom in FIG. 2. The center of gravity of the device 20 will now be forward of the center of lift of the hydroplane 22 causing the hydroplane 22 to pivot clockwise about the pivot pin 32 so that its leading forward edge 77 is lowered (FIG. 3). When the forward edge 77 of the hydroplane 22 lowers sufficiently, oncoming water will exert pressure on the upper surface 78 of the hydroplane 22 to cause the device 20 to descend. As a result of this tilting action, the strut 50 forces the housing 24 to pivot counterclockwise to the position shown in FIG. 3. The legs 67 and 68 of the bimetallic element 65 prevent the weight 60 from rolling rearwardly and downwardly within the housing 24. As the device 20 descends, the temperature of the water will generally decrease, thereby causing the legs 67 and 68 of the bimetallic element 64 to gradually separate and the legs 67 and 68 of the bimetallic element 65 to close. When a desired cooler water temperature is reached, the weight 60 will be released by the bimetallic element 64 and roll downwardly and rearwardly toward the rearward end 62 where it will be captured by the bimetallic element 65 which is now closed sufficiently to grip the sides of the weight 60.

With the weight 60 in the position shown in phantom in FIG. 3, the center of gravity of the device 20 will now lie rearwardly of the center of lift of the hydroplane 22 so that the hydroplane 22 will swing counterclockwise about the pivot pin 32 so that its leading edge 77 will be higher than its trailing edge 79. As a result, oncoming water will once again act on the bottom surface 76 and cause the device 20 to ascend. The upward movement of the leading edge 77 of the hydroplane 22 operates the strut 50 to pull the rearward end 62 of the housing 24 upward to the position shown in FIG. 2. The weight 60 is now gripped by the bimetallic element 65 so that it cannot roll downward toward the forward end 61 until a higher ambient temperature of the surrounding water is reached.

The screws 70 permit the temperature at which the bimetallic elements 64 and 75 are activated and deactivated to be adjusted so that the temperature range in which the device 20 operates may be modified. As seen in FIG. 4, in exaggerated fashion, the legs 67 and 68 of the bimetallic elements 64 and 65 can be moved apart by tightening or loosening screws 70. When the legs 67 and 68 are moved closer together, the temperature at which the weight 60 is released is either increased or decreased. The high and low limits of the operating temperature range may be independently altered.

The bimetallic elements 64 and 65 are of relatively light construction such that the momentum and inertia of the moving weight 60 is sufficient to permit the weight 60 to force its way between the legs 67 and 68 of the either bimetallic element 64 or 65 even through the legs 67 and 68 may be relatively close together. However, the weight 60 cannot, because of its mass, fall free of the bimetallic element 64 or 65 until it is released because of the frictional force applied to the weight 60 by the legs of the bimetallic elements 64 and 65.

The device 20 can be given desirable zigzag motion by bending the forward corners of the planar members 27 and 28 upwardly or by attaching a movable fin to the rear. In effect, the device 20 will imitate a swimming fish by surfacing and dividing and by zigzagging from side to side, but the device 20 will remain within a temperature range totally dictated by the operator. The device 20 may be used as a lure or a separate lure may be secured.

THE EMBODIMENT SHOWN IN FIGS. 5-9

In the embodiment illustrated in FIGS. 5-9, the temperature responsive device indicated generally at 80 includes a tubular control housing 81, a spherical weight 82 movably disposed within the tubular housing 81, a pair of bimetallic control elements 83 and 84, an actuator housing 86 configured to mount on the tubular housing 81 and the bimetallic elements 83 and 84, a towing bail 87, a tailpiece 88, and a pair of oppositely disposed hydroplane members 90 and 91, which are arcuately formed to act as wings.

The tubular housing 81 has an open forward end 93 and rearward end 94. The spherical weight 82 which has a diameter approximately equal to that of the interior of the housing 81, is movable therewithin between the ends 93 and 94. Stop means, such as screws 96 and 97, extending into the interior of the tubular housing 81 near the respective open ends 93 and 94 prevent the spherical weight 82 from moving out of the tubular housing 81.

Since each of the bimetallic elements 83 and 84 have similar configurations only one will be described in detail. The bimetallic element 83 is secured to the upper wall 98 of the actuator housing 86 within an open space 99 defined between the upper wall 98 and the tubular housing 81. The bimetallic element 83 has a leg 101 which is inwardly bowed and a leg 102 which has a projection 104 which is extensible through an aperture 105 in the tubular housing 81 into the interior thereof. The apertures 105 are spaced inboard of their respective stop screws 96 and 97 such that the projection 104 is operative within a predetermined temperature range to retain the spherical weight 82 between it and its respective stop screw. The size of the weight 82 relative to the open-ended housing 81 is not critical here since the screws 96 and 97 can be adjusted to correctly position and retain a weight of any size.

The bowed leg 101 is secured to the wall 97 by a threaded bolt 107 which extends through an oversized opening in the leg and is threaded into a nut 108 secured to the actuator housing upper wall 98. Fastened to the free end of the bolt 107 is a disc-shaped external knob 110 which can be turned to operate the bolt 107. Because of the resiliency and bowed configuration of the leg 101, the bolt 107 can be tightened or loosened so as to adjust the tension applied on the bimetallic element 83 similar to the embodiment of FIGS. 1-5. The projection 104 is thereby effectively extended into or retracted into the interior of the tubular housing 81 by rotation of the knob 110. Suitable marking can be placed on the upper surface of the knob 110 to assist adjustment by the operator.

The bimetallic elements of 83 and 84 operate oppositely. The forward bimetallic element 83 deforms so as to extend into the interior of the tubular housing 81 when the ambient temperature is relatively warm while the rearward bimetallic element 84 deforms to extend into the tubular housing 81 when the ambient temperature is relatively cool. Because of the open ends 113 and 114 of the actuator housing, water will flow into the space 99 so that the bimetallic elements therein are directly responsive to existing ambient water temperature.

The towing bail 87 is pivotally attached to the actuator housing 86 and a line 116 may be secured within the forward loop portion 117 so that the device 80 can be towed through the water. Secured to the towing bail 87 is an arcuate nosepiece 118 which is positioned forwardly of the tubular housing 81. When the device 80 is pulled through the water, the nosepiece 118 slips from side to side to slip off water pressure thereby giving the device 80 desirable to and fro movement. As will also later be evident, the orientation of the towing bail 87 relative to horizontal is dependent on whether the device is ascending or descending.

In FIG. 6, the device is shown in an ascending orientation. The weight 82 is at the rear of the tubular housing 81 so that the wings 90 and 91 are nearly horizontal and the tubular housing 81 is at a slight downward angle. The nosepiece 118 blocks the forward open end 93 so that oncoming water does not enter the tubular housing 81. When the temperature level increases to a predetermined upper limit the bimetallic element 84 deforms so that its projection 104 is retracted from the tubular housing 81 to release the spherical weight 82 which then moves downward and forwardly through the still water within the tubular housing 81. The bimetallic element 83 will spring upwardly because of the force of the moving weight 82, but will retain the weight 82 at the forward end.

When the weight 82 is at the forward position as shown in FIG. 7, the center of gravity of the device will lie forwardly so that the tubular housing 81 and wings 90 and 91 tilt downwardly. The open forward end 93 is then exposed to the oncoming water. Oncoming water exerts pressure on the upper surface of the wings 90 and 91 so that the device dives until the water temperature activates the bimetallic element 83 to release the weight 82. The weight 82 is then urged rearwardly and upwardly by the force of the oncoming water. When the weight 82 is once again retained at the rear by the rearward bimetallic element 84, the device 80 will again ascend.

The wings 90 and 91 herein provide as little resistance to the water as possible. When the weight 82 is positioned rearwardly, the leading edge of the wings 90 and 91 is caused to rise and present itself at an angle to forward motion which will give greatest lift. The wings 90 and 91 acting as an air foil cause the device 80 to rise slowly. When the device 80 is descending, the top surface of the wings 90 and 91 is disposed to the onrushing water so that the device 80 dives. However, the wings 90 and 91 provide sufficient lift so that the resultant dive is not too steep. As a result of the airfoil effect, the device 80 rises and falls relatively slowly and with as little resistance to water pressure as possible.

THE EMBODIMENT SHOWN IN FIGS. 10-12

Referring to FIGS. 10-12, another embodiment of the invention, generally designated 130, is seen to include a pair of hydroplanes or diving planes 131 and 132, a swinging weight housing 134, a nosepiece 135, and a towing bail 137.

As seen in FIG. 12, the diving planes 131 and 132 extend outwardly and upwardly relative to the housing 134 and have downwardly spaced side walls 139 and 140 between which the housing 134 is disposed.

The housing 134 has a pair of outwardly extending stub shafts 142 and 143 which extend through the side walls 139 and 140 of the diving planes 131 and 132 so as to rotatably connect the housing 134 thereto. The towing bail 137 is generally U-shaped and has spaced legs 145 and 146 whose ends are mounted to the stub shafts 142 and 143, respectively. The legs 145 and 146 extend upwardly through respective apertures 148 and 149 formed in the diving planes 131 and 132. A flat hook 151 connected to one end of a towing line 152 is connected to the towing bail 137 so that the device 130 may be pulled through the water. A line 154 extends from the hook 151 and carries a fishing hook or lure (not shown).

The housing 134 and thermal responsive elements have a construction generally similar to that shown in FIGS. 1-4. The bimetallic temperature control elements 156 and 157 are adapted to retain a circular weight 160 at predetermined temperature ranges. The weight 160 is seen to include a central disc 161 having outwardly projecting hubs 142 which maintains the weight 160 in proper alignment within the housing 134.

As seen in FIG. 11 in solid lines, the device 130 is in a descending orientation. The main feature of this embodiment is to employ water pressure to position the housing 134 at an angle opposite to that of the diving planes 131 and 132 so that the weight 160 will always be in a position to run downwardly under the influence of gravity when a selected temperature is encountered.

The weight housing 134 is provided with suitable fin means, such as an upper vane 164 and a lower vane 165. The nosepiece 135 lies forward of the housing 134 so as to prevent water from striking the housing 134 and, at particular orientations, the vane 164 or 165. When the device 130 is in a descending orientation as shown in FIG. 11, the direction of the oncoming water is indicated by the arrows 167. The weight 160 is held by the bimetallic element 156 at the forward end of the housing 134 so that the center of gravity of the device lies forward of the center of lift of the diving planes 131 and 132 such that the device is tilted downwardly so that the upper surfaces thereof are exposed to drive the device downwardly to a lower depth. Because of this downward orientation of the device, oncoming water reacts on the vane 164 to effect rotation of the housing 134 about the stub shafts 142 and 143. The nose piece 135, when the device is in this orientation, prevents oncoming water from striking vane 165 and, therefore, prevents water pressure from acting on vane 165 and rotating the housing 134 clockwise.

When the temperature of the water decreases to a predetermined level, the bimetallic element 156 releases the weight 160 so that it rolls downwardly and rearwardly toward the bimetallic element 157. As a result, the center of gravity of the device lies rearward of the center of lift. The device will then have an upward orientation (not shown). The orientation of the housing 134 relative to the remainder of the device is shown in phantom in FIG. 11. Although the orientation of the entire device is not shown in FIG. 11, oncoming water is moving in a direction relative to the device as shown by arrows 168. The oncoming water now reacts on the undersurface of the diving planes 131 and 132 to effect ascent. The nosepiece 135 now prevents oncoming water from acting on the upper vane 164, but allows oncoming water to act on the lower vane 165 to effect clockwise rotation of the housing 134. Now, when the temperature increases to a predetermined level, the weight 160 can roll downwardly toward the forward end of the housing 134 when it is released.

It should be noted that the towing bail 137 remains at a substantially constant angle with vertical when it is towed. The diving planes 131 and 132 change angle relative to the bail 137 when the center of gravity of the device 130 is altered. The nosepiece 135 is fixed relative to the diving planes 131 and 132 so that it changes angle along with the diving planes 131 and 132.

As seen in FIGS. 10 and 11, the device includes a tailpiece 170. The tailpiece 170 closes the opening between the diving planes 131 and 132 so that when the housing 134 rotates counterclockwise the upper vane 164 will come to rest on the tailpiece 170 to prevent further rotation of the housing 134. Likewise, the towing bail 137 includes a locking vane 171 which is operative when the housing 134 is rotated counterclockwise to contact the upper vane 164 and prevent further rotation thereof.

When the action of the device 130 is to be discontinued as when a fish is on the line, the device may be released from the hook 151. Pressure acting forwardly and upwardly on the hook 151 maintains the hook 151 on the towing bail 137. However, dipping of the fishing pole removes the tension on the line 152 so that towing bail is released through the forward opening of the hook 151. An auxiliary line 174 extends from the hook 151 and is connected to the nosepiece 135 so that the device is not lost when released. Whenever the hook 151 is not engaged, the line 174 pulls on the nosepiece 135 and cause the device to surface with little resistance on the line. If a fish strikes, the lure or hook attached to the hook 151 via the line 154 pulls the hook 151 from the bail 137.

The devices described herein dive to the desired temperature range providing sufficient line is let out from the fishing reel. An excess amount of line has no bearing on the performance of the device. When enough line has been let out the pull on the pole caused by the water pressure on the device lessens since the device has reached the proper depth and is ascending.

I claim:

1. A device adapted to be secured to a tow line so that it may be pulled forwardly through water, the device changing its depth in response to a change in the ambient temperature of the surrounding water, the device comprising:
    a hydroplane;
    a housing carried by said hydroplane and having forward and rearward ends;
    a weight movably disposed within said housing and having sufficient mass to change the longitudinal position of the center of gravity of the device substantially when moved, said housing being configured to permit said weight to move longitudinally therewithin between said forward and rearward ends;
    a pair of thermal control elements responsive to ambient temperature positioned one near each end of said housing, said thermal control elements deforming with changes in temperature and adapted to retain said weight at their respective ends of said housing whenever ambient temperature is within a predetermined range; and
    means for effecting movement of said weight when released by one of said thermal control elements so that it moves toward the opposite end of said housing, whereby said weight when retained at said forward end of said housing causes said hydroplane to be tilted forwardly thereby causing oncoming water to react on said hydroplane so as to force the device to descent and said weight when retained at said rearward end of said housing causes said hydroplane to be tilted rearwardly thereby causing oncoming water to react on said hydroplane so as to force the device to ascend.

2. The device of claim 1 wherein said means for effecting movement of said weight comprises means for pivotally connecting said housing to said hydroplane to swing about a transverse horizontal axis, and means for pivotally tilting said housing relative to horizontal so that the end of said housing at which said weight is retained is at a higher level than the other end so that said weight when released by one of the thermal control elements moves by gravity towards the lower end.

3. The device of claim 2 wherein said housing is disposed below the top of said hydroplane and said means for pivotally tilting said housing includes an upright mast having an upper end adapted to be secured to a tow line, a lower end connected to the top of said housing between the ends thereof and an intermediate segment connected to the hydroplane and a strut connecting the forward end of said hydroplane to the rearward end of said housing, said housing thereby being pivotally connected to said hydroplane by said mast and tilted by said strut in a direction relative to horizontal generally equal and opposite to that of said hydroplane.

4. The device of claim 2 wherein said means for pivotally tilting said housing includes fin means carried by said housing disposed to extend upwardly and downwardly therefrom, and further including a nosepiece fixedly secured to said hydroplane forward of said housing to prevent oncoming water from reacting on said housing, said fin means having a length permitting oncoming water flowing past said nosepiece to react on said fin means during certain orientations of the device so as to effect pivotal movement of said housing, whereby when the device is descending and tilted forwardly, said nosepiece permits oncoming water to react only against said fin means extending upwardly thereby causing said housing to be tilted rearwardly so that said weight may move by gravity to the rearward end when it is released by the forward thermal control element and whereby when the device is ascending and tilted rearwardly, said nosepiece permits oncoming water to react only against said fin means extending downwardly thereby causing said housing to be tilted forwardly so that said weight may move by gravity to the forward end when it is released by the rearward thermal control element.

5. The device of claim 1 wherein said housing has an open forward end permitting oncoming water to flow into said housing, said housing being fixed relative to said hydroplane so that it is tilted forwardly relative to horizontal during ascent and descent of the device, and further including means for preventing oncoming water from entering the forward end of said housing only when the device is ascending, whereby said weight is forced rearwardly against gravity by the pressure of oncoming water entering the forward end of the housing when it is released by the forward end and whereby said weight is moved by gravity forwardly through still water when it is released by the rearward thermal control element.

6. The device of claim 1 further including means for adjusting each of said thermal control elements to selectively set the temperature range within which the thermal control element is operative to retain said weight.

7. The device of claim 1 wherein said thermal control elements are bimetallic strips, said strips being thermally deformable to bend in response to a change in temperature, a bimetallic strip at the forward end of said housing being operative to retain said weight at the forward end when the ambient temperature is greater than a preselected temperature, a bimetallic strip at the rearward end of said housing being operative to retain said weight at the rearward end when the ambient temperature is less than a preselected temperature.

8. The device of claim 7 wherein each of said bimetallic strips has a base portion against an end of said housing and a pair of spaced apart legs extending longitudinally inward from said base portion whereby said weight is movable therebetween, the legs of one bimetallic strip moving together to hold said weight and moving apart to release said weight within selected temperature ranges, the legs of the rearward strip moving apart when the ambient temperature rises, the legs of the forward strip moving apart when the ambient temperature drops.

9. The device of claim 7 wherein said base portion has a segment intermediate said leg portions spaced from the end of said housing so that the bimetallic strips are approximately W-shaped, and further including means for adjustably securing said intermediate segment to the end of said housing, whereby said securing means when operated positions said intermediate segment at a selected distance from the end of said housing thereby changing the spacing between said legs so that the ambient temperature required to release said weight is modified.

10. The device of claim 1 wherein each of said thermal control elements is substantially disposed outside of said housing, and further including a passageway providing communication with the interior of said housing for each of said thermal control elements, a thermal control element, at selected temperatures, extending through said passageway into the interior of said housing to partially block the path along which said weight moves and thereby trap said weight at an end of said housing.

11. The device of claim 10 further including means for adjusting each of said thermal control elements to selectively set the temperature range within which the thermal control element is operative to retain said weight.

12. The device of claim 10 further including an actuator fixed to the weight housing and providing an external mounting for said thermal control elements, said passageways extending from said actuator housing to the interior of the weight housing.

13. The device of claim 12 wherein each of said thermal control elements is a bimetallic strip having an approximate U-shaped configuration with spaced apart legs, one leg of said bimetallic strip being generally aligned with said housing and having an outward projection extensible into the weight housing, the other leg of said bimetallic strip being generally aligned with and mounted on said actuator housing, said other leg having an intermediate segment spaced from said actuator housing, and further including means for adjustably securing said intermediate segment to said actuator housing, whereby said securing means, when operated, positions said intermediate segment at a selected distance from the end of said housing thereby changing the spacing between said legs so that the ambient temperature required to release said weight is modified.

14. The device of claim 1 wherein said hydroplane comprises a pair of downwardly diverging planar members joined along their respective upper edges so that the hydroplane has an inverted V-shaped cross section, said housing being mounted between the planar members below the junction thereof.

15. The device of claim 1 wherein said hydroplane comprises a pair of wing-like portions extending in opposite directions outwardly away from said housing.

16. The device of claim 1 wherein said hydroplane comprises a pair of planar members extending in opposite directions outwardly away from said housing at a slight upward angle.

17. The device of claim 1 wherein said weight is generally disc-shaped, said housing being adapted to maintain said weight on its circular edge so that said weight rolls between the ends thereof.

18. The device of claim 1 wherein said weight is spherical.

19. The device of claim 18 wherein said housing is tubular and has an inside diameter approximately equal to the diameter of said weight.

20. The device of claim 1 further including a towing bail pivotally connected to the device, a hook opening forwardly to engage said towing bail which depends downwardly therefrom, said hook having a configuration such that it is released from said bail whenever the tension of the tow line is removed.

21. The assembly of claim 20 further including an auxiliary line connected between said hook and the device so as to retain the device on the tow line after said hook is released from said towing bail.

22. A temperature responsive fishing device adapted to be secured to a line so that it may be pulled forwardly through water, the device changing its depth in response to a change in the ambient temperature of the surrounding water, the device comprising:

a hydroplane formed from a pair of downwardly diverging planar members joined along their respective upper edges, said hydroplane having upper and lower surfaces;

a housing pivotally connected to said hydroplane between said planar members below the junctions of said planar members to swing about a transverse horizontal axis, said housing having forward and rearward ends;

a weight movably disposed within said housing and having sufficient mass to change the longitudinal position of the center of gravity of the device substantially when moved, said housing being configured to permit said weight to move longitudinally therewithin between said forward and rearward ends;

a pair of thermal control elements responsive to ambient temperature positioned one near each end of said housing, said thermal control elements deforming with changes in temperature and being adapted to retain said weight at their respective ends of said housing whenever ambient temperature is within a predetermined range, said weight when retained at said forward end of said housing causes said hydroplane to be tilted forwardly thereby causing oncoming water to react on the upper surface of said hydroplane to force the device to descend and said weight when retained at said rearward end of said housing causes said hydroplane to be tilted rearwardly thereby causing oncoming water to react on the lower surface of said hydroplane to force the device to ascend; and linkage means for tilting said housing in a direction opposite to that of said hydroplane, whereby when the device is ascending and tilted forwardly, said housing is tilted rearwardly so that said weight moves by gravity to the rearward end when it is released by the respective thermal control element and whereby when the device is descending and tilted rearwardly, said housing is tilted forwardly so that said weight moves by gravity to the forward end when it is released by the respective thermal control element.

23. A temperature responsive fishing device adapted to be secured to a line so that it may be pulled forwardly through water, the device changing its depth in response to a change in the ambient temperature of the surrounding water, the device comprising:

a housing having an open forward end and a rearward end;

a hydroplane carried by said housing including a pair of wing-like portions extending in opposite directions outwardly therefrom;

a weight movably disposed within said housing and having sufficient mass to change the longitudinal position of the center of gravity of the device substantially when moved, said housing being configured to permit said weight to move longitudinally therewithin between said forward and rearward ends;

a pair of thermal control elements responsive to ambient temperature positioned one near each end of said housing, said thermal control elements deforming with changes in temperature and being adapted to retain said housing whenever ambient temperature is within a predetermined range, said weight when retained at said forward end of said housing causes said hydroplane to be tilted forwardly thereby causing oncoming water to react on said hydroplane to force the device to descend and said weight when retained at said housing causes said hydroplane to be tilted rearwardly thereby causing oncoming water to react on said hydroplane to force the device to ascend, said housing being fixed relative to said hydroplane so that it is tilted forwardly relative to horizontal during ascent and descent of the device; and means for preventing oncoming water from entering the forward end of said housing only when the device is ascending, whereby said weight is forced rearwardly against the force of gravity by the pressure of oncoming water entering the forward end of the housing, when it is released by the forward thermal control element and whereby said weight is moved by the force of gravity forwardly through still water when released by the rearward thermal control element.

24. A temperature responsive fishing device adapted to be secured to a line so that it may be pulled forwardly through water, the device changing its depth in response to a change in the ambient temperature of the surrounding water, the device comprising:

a hydroplane having upper and lower surfaces;

a nosepiece fixed to the forward portion of said hydroplane;

a housing pivotally mounted to said hydroplane rearwardly of said nosepiece to swing about a transverse horizontal axis, said nosepiece operating to prevent oncoming water from reacting on said housing, said housing having forward and rearward ends;

a weight movably disposed within said housing and having sufficient mass to change the longitudinal position of the center of gravity of the device substantially when moved, said housing being configured to permit said weight to move longitudinally therewithin between said forward and rearward ends;

a pair of thermal control elements responsive to ambient temperature positioned one near each end of said housing, said thermal control elements deforming with changes in temperature and being adapted to retain said weight at their respective ends of said housing whenever ambient temperature is within a predetermined range, said weight when retained at said forward end of said housing causes said hydroplane to be tilted forwardly thereby causing oncoming water to react on the upper surface of said hydroplane to force the device to descend and said weight when retained at said rearward end of said housing causes said hydroplane to be tilted rearwardly thereby causing oncoming water to react on the lower surface of said hydroplane to force the device to ascend;

fin means carried by said housing and disposed to extend upwardly and downwardly therefrom, said fin means having a length permitting oncoming water flowing past said nosepiece to react thereon during certain orientations of the device so as to effect pivotal movement of said housing, whereby when the device is descending and tilted forwardly, said nosepiece permits oncoming water to react only against said fin means extending upwardly thereby causing said housing to be tilted rearwardly so that said weight may move by gravity to the rearward end when it is released by the respective thermal control element and whereby when the device is ascending and tilted rearwardly, said nosepiece permits oncoming water to react only against said fin means extending downwardly thereby causing said housing to be tilted forwardly so that said weight may move by gravity to the forward end when it is released by the respective thermal control element.

* * * * *